(12) United States Patent
Chen et al.

(10) Patent No.: US 11,104,604 B2
(45) Date of Patent: Aug. 31, 2021

(54) LOW SPARKLE ANTI-GLARE GLASS-BASED ARTICLES WITH REDUCED WARP AND METHODS OF REDUCING WARP IN ANTI-GLARE GLASS-BASED ARTICLES

(71) Applicant: CORNING INCORPORATED, Corning, NY (US)

(72) Inventors: Haixing Chen, Shanghai (CN); Ling Chen, Shanghai (CN); Chenglong Dai, Shanghai (CN); Liming Wang, Painted Post, NY (US); Li Yao, Painted Post, NY (US); Jianqiang Zhu, Shanghai (CN)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/485,337

(22) PCT Filed: Feb. 9, 2018

(86) PCT No.: PCT/US2018/017579
§ 371 (c)(1),
(2) Date: Aug. 12, 2019

(87) PCT Pub. No.: WO2018/152021
PCT Pub. Date: Aug. 23, 2018

(65) Prior Publication Data
US 2020/0017400 A1   Jan. 16, 2020

(30) Foreign Application Priority Data
Feb. 14, 2017   (CN) .......................... 201710078743.4

(51) Int. Cl.
*B32B 3/30* (2006.01)
*C03C 15/00* (2006.01)
(Continued)

(52) U.S. Cl.
CPC ................ *C03C 15/00* (2013.01); *B32B 3/30* (2013.01); *B32B 7/12* (2013.01); *B32B 17/06* (2013.01);
(Continued)

(58) Field of Classification Search
CPC ........... B32B 3/30; B32B 17/06; B32B 17/12; B32B 2457/20; G02B 5/02; G02B 1/12
See application file for complete search history.

(56) References Cited

U.S. PATENT DOCUMENTS

| 4,009,993 A | 3/1977 | Marazzi |
| 4,354,828 A | 10/1982 | Benton et al. |

(Continued)

FOREIGN PATENT DOCUMENTS

| WO | 2014/012003 A2 | 1/2014 |
| WO | 2014/130515 A1 | 8/2014 |
| WO | 2014/139147 A1 | 9/2014 |

OTHER PUBLICATIONS

International Search Report and Written Opinion of the International Searching Authority; PCT/US2018/017579; dated Apr. 26, 2018; 18 Pages; European Patent Office.

*Primary Examiner* — Donald J Loney
(74) *Attorney, Agent, or Firm* — John P. McGroarty

(57) ABSTRACT

Anti-glare glass-based articles and methods of processing a glass based article to reduce warp are disclosed. A method for processing a glass-based article includes etching a first surface of the glass article to create a first anti-glare surface having a plurality of first anti-glare features and etching a second surface of the glass-based article to create a second anti-glare surface having a plurality of second anti-glare features. At least one of a length, a width, and a diagonal of the glass-based article is greater than or equal to 500 mm. A difference of warp between a first warp value before etching the first surface and the second surface and a second warp (Continued)

value after etching the first surface and the second surface is less than or equal to 0.15 mm across each of one or more 500 mm intervals of length, width, or diagonal of the glass-based article.

6 Claims, 7 Drawing Sheets

(51) Int. Cl.
    *B32B 7/12*     (2006.01)
    *B32B 17/06*     (2006.01)
    *C03C 21/00*     (2006.01)
    *G02B 1/12*     (2006.01)
    *G02B 5/02*     (2006.01)

(52) U.S. Cl.
    CPC .............. *C03C 21/002* (2013.01); *G02B 1/12* (2013.01); *G02B 5/0231* (2013.01); *B32B 2307/42* (2013.01); *B32B 2315/08* (2013.01); *B32B 2457/20* (2013.01)

(56) References Cited

U.S. PATENT DOCUMENTS

| | | | |
|---|---|---|---|
| 8,778,496 | B2 | 7/2014 | Hart |
| 9,651,720 | B2 | 5/2017 | Lander et al. |
| 9,840,436 | B2 | 12/2017 | Allan |
| 10,071,933 | B2 | 9/2018 | Wang et al. |
| 2005/0258135 | A1 | 11/2005 | Ishikawa et al. |
| 2011/0267698 | A1* | 11/2011 | Guilfoyle ................ C03C 15/00 359/609 |
| 2012/0134024 | A1* | 5/2012 | Lander ................ G02B 5/0294 359/599 |
| 2013/0093312 | A1 | 4/2013 | Ono et al. |
| 2016/0023946 | A1 | 1/2016 | Hotta et al. |
| 2016/0046519 | A1 | 2/2016 | Tanaka |

\* cited by examiner

LOW SPARKLE ANTI-GLARE GLASS-BASED ARTICLES WITH REDUCED WARP AND METHODS OF REDUCING WARP IN ANTI-GLARE GLASS-BASED ARTICLES

CROSS-REFERENCE TO RELATED APPLICATIONS

This application claims the benefit of priority under 35 U.S.C. § 365 of International Patent Application Serial No. PCT/US18/17579 filed on Feb. 9, 2018, which claims the benefit of priority under 35 U.S.C. § 119 of Chinese Patent Application Serial No. 201710078743.4 filed on Feb. 14, 2017, the content of each are relied upon and incorporated herein by reference in their entirety.

BACKGROUND

Field

The present disclosure generally relates to anti-glare glass-based articles, and, more particularly, low sparkle anti-glare glass-based articles with reduced warp and methods for reducing warp in anti-glare glass-based articles.

Technical Background

Anti-glare glass articles, such as cover glasses for electronic displays, particularly large electronic displays, such as those found in handheld devices, television displays, touch panels, electronic whiteboards, computer monitors, and the like may be particularly constructed to reduce the amount of glare caused by light that is reflected off the glass articles. For example, the anti-glare glass articles may be constructed with a textured surface that effectively reduces surface glare. However, such glass articles that incorporate a textured surface may exhibit warp due to a surface treatment bias (one side having anti-glare features while a second side does not) that causes a differential surface-to-volume ratio. This may cause differential surface compressive loading of the two surfaces that causes glass warping. Warp may be further introduced into anti-glare glass articles subjected to a strengthening process. Particularly, large anti-glare glass articles (e.g., anti-glare glass articles having a diagonal dimension of 500 mm or greater) may exhibit significant warp. Warp may be undesirable and may cause the anti-glare glass articles to not meet specifications.

Accordingly, a need exists for anti-glare glass articles having reduced warp.

SUMMARY

In one embodiment a method for processing a glass-based article includes etching a first surface of the glass-based article to create a first anti-glare surface having a plurality of first anti-glare features and etching a second surface of the glass-based article to create a second anti-glare surface having a plurality of second anti-glare features. At least one of a length, a width, and a diagonal of the glass-based article is greater than or equal to 500 mm. A difference of warp between a first warp value before etching the first surface and the second surface and a second warp value after etching the first surface and the second surface is less than or equal to 0.15 mm across each of one or more 500 mm intervals of length, width, or diagonal of the glass-based article. In some embodiments, the method may further include chemically strengthening the glass-based article by an ion-exchange process, where the difference of warp between the second warp value before chemically strengthening the first surface and the second surface and a third warp value after chemically strengthening the first surface and the second surface is less than or equal to 0.15 mm across each of one or more 500 mm intervals of length, width, or diagonal of the glass-based article. In some embodiments, the first warp value may be equal to the second warp value. In some embodiments, the first surface and the second surface may equally contribute to a total haze value of the glass-based article. In some embodiments, the first surface and the second surface may equally contribute to a total gloss value of the glass-based article. In some embodiments, the first surface and the second surface may unequally contribute to a total haze value of the glass-based article. In some embodiments, the first surface and the second surface may unequally contribute to a total gloss value of the glass-based article. In some embodiments, etching the first surface and the second surface may comprise applying an etching cream to the first surface and the second surface. In some embodiments, a total transmission haze of the glass-based article may be between 1% and 40%.

In another embodiment, a strengthened glass-based article includes a first anti-glare surface having a plurality of first anti-glare features and a second anti-glare surface having a plurality of second anti-glare features. At least one dimensional aspect of the glass-based article is greater than or equal to 500 mm, where the at least one dimensional aspect is a length, a width, or a diagonal of the glass-based article. The glass-based article has a warp of less than or equal to 0.6 mm across the at least one dimensional aspect. In some embodiments, the first surface and the second surface may equally contribute to a total haze value of the glass-based article. In some embodiments, the first surface and the second surface may equally contribute to a total gloss value of the glass-based article. In some embodiments, the first surface and the second surface may unequally contribute to a total haze value of the glass-based article. In some embodiments, the first surface and the second surface may unequally contribute to a total gloss value of the glass-based article. In some embodiments, a total transmission haze of the glass-based article may be between 1% and 40%.

In yet another embodiment, a display device includes a display panel having a display panel surface and a strengthened glass-based article coupled to the display panel. The strengthened glass-based article includes a first anti-glare surface having a plurality of first anti-glare features and a second anti-glare surface having a plurality of second anti-glare features. At least one dimensional aspect of the glass-based article is greater than or equal to 500 mm, where the at least one dimensional aspect is a length, a width, or a diagonal of the glass-based article. The glass-based article have a warp of less than or equal to 0.6 mm across the at least one dimensional aspect. In some embodiments, the glass-based article may be bonded to the display panel surface by an index-matching adhesive and the first surface and the second surface may equally contribute to a total haze value of the glass-based article. In some embodiments, the glass-based article may be bonded to the display panel surface by an index-matching adhesive and the first surface and the second surface equally may contribute to a total gloss value of the glass-based article. In some embodiments, an air gap may be present between the glass-based article and the display panel surface and the first surface and the second surface may unequally contribute to a total haze value of the glass-based article. In some embodiments, an air gap may be present between the glass-based article and the display panel surface and the first surface and the second surface may unequally contribute to a total gloss value of the glass-based article. In some embodiments, a total haze of the glass-based article may be between 1% transmittance and 40% transmittance.

Additional features and advantages of the will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
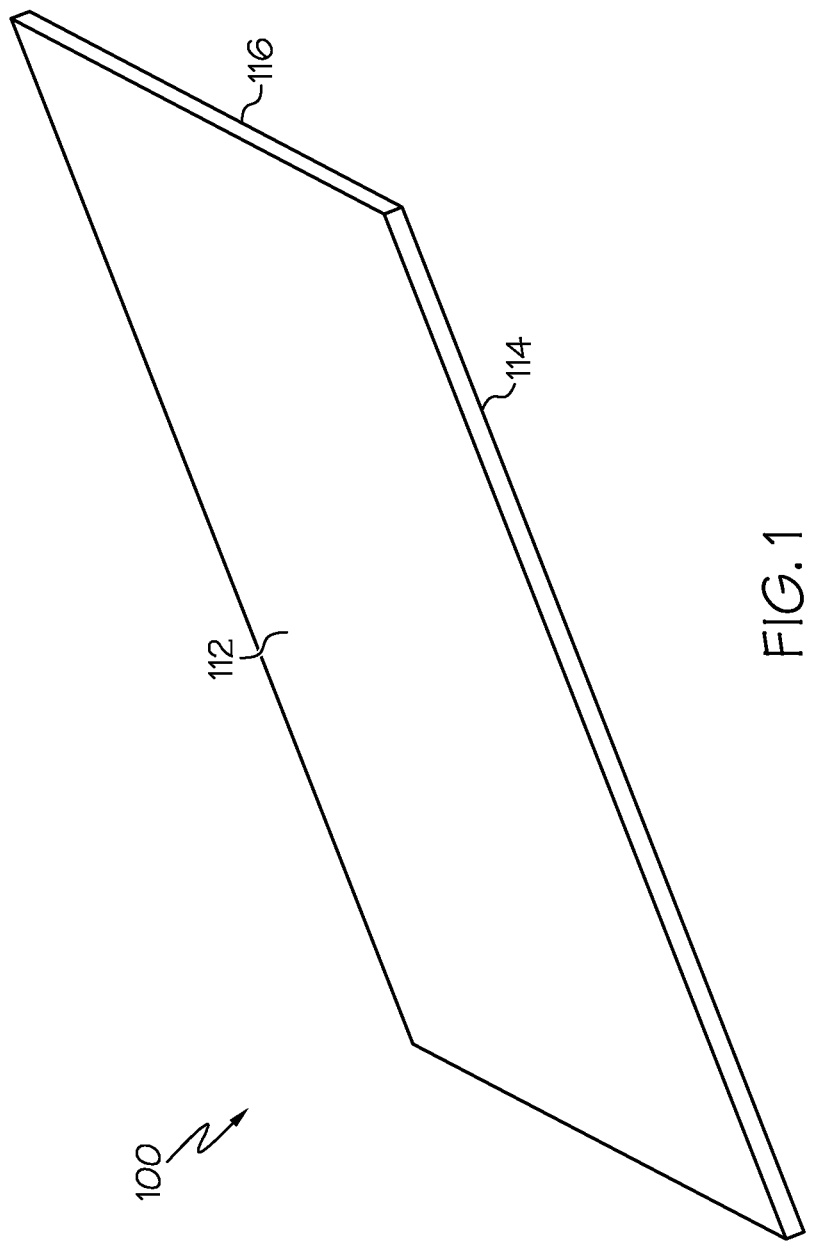
FIG. 1 schematically depicts an example glass-based article according to one or more embodiments shown and described herein.

Referring generally to the figures, embodiments of the present disclosure are directed to glass-based articles incorporating anti-glare features. Glass-based articles include articles fabricated from glass materials, glass-ceramic materials, or ceramic materials. The term "glass article" and "glass-based article" are used interchangeably herein, and both include glass materials, glass-ceramic materials, and ceramic materials. The glass articles described herein generally include anti-glare features on a plurality of surfaces thereof. As described herein, the glass articles are formed via a method that minimizes warp that occurs as a result of an ion-exchange (IOX) chemical strengthening process. Such warp may be minimized relative to warp that is observed on glass articles having anti-glare features that are formed via other methods.

Glare is the reflection of light off of a surface, such as a glass display surface of an electronic device. Too much glare may obscure the underlying display of the electronic device and may make it difficult for a user of an electronic device to see the display. Anti-glare surface treatments provide small features on the surface of the glass that scatter light, thereby reducing the appearance of glare and increasing visibility of the underlying display. However, anti-glare treatments may cause undesirable effect such as, without limitation, sparkle and haze.

Display "sparkle" or "dazzle" is a generally undesirable side effect that can occur when introducing anti-glare or light scattering surfaces into a pixelated display system such as, for example, a liquid crystal display (LCD), an organic light emitting diode (OLED), touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale.

Whereas the most common anti-glare surfaces used in the display industry are coated polymer films, the present disclosure is primarily concerned with the optical and surface properties of a transparent glass article or sheet that is used as a protective cover glass over an LCD or other pixelated displays. In particular, a transparent glass sheet having a roughened surface and optical properties that minimize display "sparkle" and a display system comprising such a transparent glass sheet are provided. Additionally, surfaces with small-angle-scattering properties or distinctness-of-reflected-image (DOI) which lead to improved viewability in display applications, especially under high ambient lighting conditions, are provided. The anti-glare surface is formed without the application or other use of foreign coating materials (e.g., coatings, films, or the like).

The origin of display sparkle has previously not been well understood. There are many potential root causes that could be hypothesized, such as interference effects, Rayleigh or Mie-type scattering, and the like. As described herein, it has been determined that the type of display sparkle that is commonly observed in pixelated displays combined with anti-glare surfaces is primarily a refractive effect in which features have some macroscopic (i.e., much larger than optical wavelength) dimensions on the surface, which cause refraction or "lensing" of display pixels into varying angles, thus modifying the apparent relative intensity of the pixels.

The glass articles having the anti-glare surface described herein may be compatible with high definition (HD) displays having pixel densities of about 200 ppi or greater. The ability to provide a low sparkle textured glass that is compatible with HD displays having high pixel density may create opportunities for integrating textured surfaces with consumer electronic devices. The glass articles may provide a glass with low sparkle that exhibits positive aesthetic appearance, good tactile feel, and anti-glare functionality.

Anti-glare glass with ultra-sparkle has been the subject of intensive research in recent years for their wide application in display and lighting. Generally, anti-glare glass that sized for use in devices such as smartphones and tablets shows good performance on both optical attributes and mechanical properties. However, anti-glare glass of larger sized devices, such as televisions and large touch screens, may exhibit warp issues on the glass surface, which is due to their larger size and the thickness of the glass. Some approaches to reducing warp, such as optimizing IOX temperature profiles, improving glass cassettes for IOX, and/or the like are implemented during an IOX treatment step. As such, while such approaches may demonstrate some effectiveness on warm reduction for non-anti-glare parts of the glass, they have limited effect on glass with asymmetric surface profiles on two sides, which are generated prior to IOX treatment, such as an etching step.

An IOX treatment strengthens the glass article by exchanging smaller ions near a surface of a glass article with larger ions of an ion exchange solution. A non-strengthened glass article may be disposed in an ion-exchange bath for a period of time in accordance with an ion-exchange process. Larger ions within the ion-exchange bath are exchanged with smaller ions of the glass material. As an example and not a limitation, the ion-exchange bath may comprise a potassium salt such that larger potassium ions are exchanged with sodium ions of the glass material. The exchange of ions occurs from a surface of a glass article to a depth of layer (DOL). The ion-exchanged region is referred to as a compressive stress layer. Thus, a first compressive stress layer is present at the first surface and a second compressive stress layer is present at the second surface. The first and second compressive stress layers possess compressive stress, which is balanced by tensile stress within a central tension region between the first compressive stress layer and the second compressive stress layer.

As described in more detail below, anti-glare surface treatments provided on only a single side (i.e., surface) may cause the glass article to warp, particularly during and following the IOX treatment. Without being bound by theory, the single-sided anti-glare treatment may create a differential surface to volume ratio (wrinkled surface has higher surface to volume ratio than smooth surface), which may lead to higher compressive loading on the side having the anti-glare treatment than the side lacking the anti-glare treatment. The non-uniform stress profiles may create a bending moment within the glass article, which may cause the glass article to warp.

The amount of warp depends on factors such as, without limitation, the size of the glass article, the thickness of the glass article, the composition of the glass article, the size, shape and distribution of surface features of the anti-glare surface, and parameters of the IOX treatment. For example, it has been shown that larger glass articles exhibit more warp than smaller glass articles.

Accordingly, it may be desirable to enhance flatness (e.g., minimize warp) of large size anti-glare glass parts that include IOX treatment. The processes described herein may be effective in reducing warp before and after IOX treatment. As will be described in greater detail herein, an etching cream process may be applied to roughen a plurality of surfaces of the glass. The symmetry surface texture on the plurality of sides of the glass may minimize the creation of warped surfaces of anti-glare glass parts.

FIG. 1 schematically illustrates an illustrative glass article 100 that may be used for an electronic device having a screen that is larger than screens that are typically included in smart phones, tablets, or the like. That is, the illustrative glass article 100 may be used for an electronic device such as a television, an electronic display, an electronic whiteboard, or the like, particularly electronic devices where it may be desirable to eliminate, reduce, and/or minimize glare. For example, the illustrative glass article 100 may be used in an electronic device having a screen with at least one dimension (e.g., a length, a width, or a diagonal) that is greater than or equal to about 500 mm.

The glass article 100 may be, for example, a soda lime glass, an alkali aluminosilicate glass, or an alkali aluminoborosilicate glass. In some embodiments, the glass article 100 may be a transparent glass sheet. As used herein, the glass is transparent if it transmits at least 70% of at least one wavelength in a range from about 390 nm to about 700 nm. In some embodiments, the glass article 100 may include an alkali aluminosilicate glass that incorporates alumina, at least one alkali metal, and silica ($SiO_2$). An amount of silica within the glass article 100 may be greater than about 50 mol %, at least about 58 mol % $SiO_2$, or at least about 60 mol % $SiO_2$. Examples of aluminosilicate glass substrates suitable for use as the glass article 100 may include, but are not limited to, GORILLA®, EAGLE XG®, or LOTUS™ brand glass manufactured by Corning Incorporated. Other suitable substrates are contemplated. The glass article 100 may include a strengthened glass substrate, which has been strengthened using thermal or chemical strengthening techniques.

Figure 2:
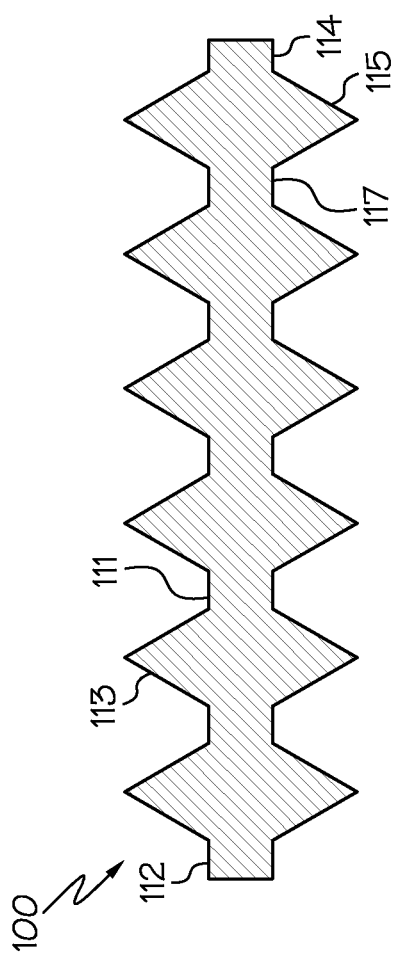
FIG. 2 schematically depicts a cross-sectional view of an example glass-based article having a plurality of anti-glare surfaces according to one or more embodiments shown and described herein.

Referring to both FIGS. 1 and 2, the glass article 100 has a first surface 112, a second surface 114, and a perimeter edge 116 disposed between the first surface 112 and the second surface 114. In various embodiments, the first surface 112 may be an anti-glare surface having one or more first surface features 113 disposed thereon. Similarly, the second surface 114 may also be an anti-glare surface having one or more second surface features 117 disposed thereon in various embodiments.

The first surface features 113 are generally not limited in size, shape, or configuration, and may be any size, shape, and/or configuration that is suitable to provide the first surface 112 with anti-glare properties. For example, in some embodiments, the first surface features 113 may have an average size of less than about 20 microns. In other embodiments, the first surface features 113 may have an average size of less than about 10 microns. In embodiments where the one or more first surface features 113 includes a plurality of first surface features 113, at least a portion of the plurality of first surface features 113 may be spaced apart from one another, and each of the plurality of first surface features 113 may be bounded by the one or more first flat regions 111. The first surface features 113 may be spaced apart from one another such that the first flat regions 111 generally extend between each of the first surface features 113. In other embodiments, the first surface features 113 may be connected to one another such that there is no (or limited) flat regions 111 between adjacent surface features 113. The resulting anti-glare surface 112 may include a plurality of curved surfaces distributed across a flat surface so that the anti-glare surface 112 is a mixture of flat and curved surfaces. The distribution of first surface features 113 across the first surface 112 may provide anti-glare properties and acceptable aesthetic appearance and feel while at the same time providing a low sparkle glass.

Similarly, the second surface features 115 are generally not limited in size, shape, or configuration, and may be any size, shape, and/or configuration that is suitable to provide the second surface 114 with anti-glare properties. For example, in some embodiments, the second surface features 115 may have an average size of less than about 20 microns. In other embodiments, the second surface features 115 may have an average size of less than about 10 microns. In embodiments where the one or more second surface features 115 includes a plurality of second surface features 115, at least a portion of the plurality of second surface features 115 may be spaced apart from one another, and each of the plurality of second surface features 115 may be bounded by the one or more second flat regions 117. The second surface features 115 may be spaced apart from one another such that the second flat regions 117 generally extend between each of the second surface features 115. In other embodiments, the first surface features 115 may be connected to one another such that no (or limited) flat regions 117 exist between adjacent surface features 115. The resulting anti-glare surface 114 may include a plurality of curved surfaces distributed across a flat surface so that the anti-glare surface 114 is a mixture of flat and curved surfaces. The distribution of second surface features 113 across the flat surface may provide anti-glare properties and acceptable aesthetic appearance and feel while at the same time providing a low sparkle glass.

Figure 3:
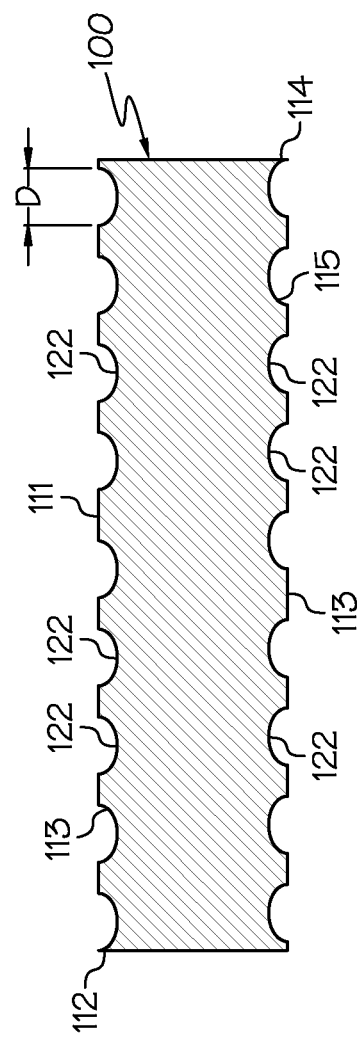
FIG. 3 schematically depicts a cross-sectional view of another example glass-based article having a plurality of anti-glare surfaces according to one or more embodiments shown and described herein.

The first surface features 113 and/or the second surface features 115 of the respective first surface 112 and second surface 114 of the glass article 100 may be protrusions 120 or the like that extend outward from the glass article 100, as shown in FIG. 2. It should be understood that the first features 113 and the second features 115 are not limited to the pyramidal shape depicted in FIG. 2 and that other shapes and configurations are also possible. Referring to FIG. 3, another glass article 100' is schematically illustrated wherein the first surface features 113' and/or the second surface features 115' may be depressions 122 or the like that are recessed into the glass article 100. The size of each of the first surface features 113' and the second surface features 115' may be defined as the largest dimension D of each respective surface feature 113', 115' when the surface features 113', 115' are viewed from a direction perpendicular to the respective surfaces 112', 114' of the glass article 100' (i.e., in top view). An average size of the respective surface features 113', 115' may be less than about 20 microns, less than about 10 microns, or less than about 5 microns. Alternatively, each of the respective surface features 112', 114' may have a largest dimension D that is equal to or less than about 20 microns, equal to or less than about 10 microns, or equal to or less than about 5 microns.

It should be understood that the respective first and second surfaces (as well as the surface features and flat regions thereof) described above are merely illustrative examples. Other anti-glare surfaces that incorporate different surface features and/or flat regions (such as continuous surface features or the like) are also included within the scope of the present disclosure. For example, the first and/or second surfaces 112, 114 may have surface features that are all interconnected in a continuous texture, and no flat regions are interspersed between the surface features. The continuous distribution of the surface features may be such that each surface feature is connected to and/or abuts up against each immediately adjacent surface feature with no intervening flat areas and no interruption in the continuity of the continuous textured layer.

The surface features described providing anti-glare functionality described herein may be formed by any known or yet-to-be-developed process.

Figure 4:
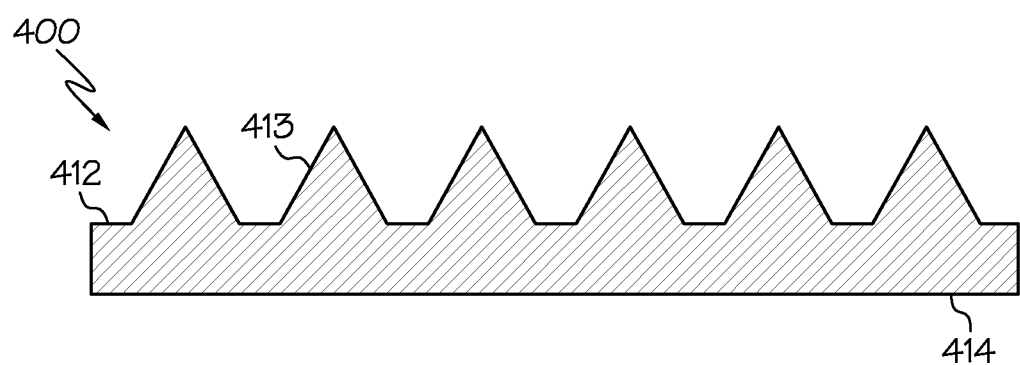
FIG. 4 schematically depicts a cross-sectional view of an example glass article having a single anti-glare surface.

As indicated herein, the first surface 112 and the second surface 114 respectively include the first surface features 113 and the second surface features 115. Inclusion of the surface features 113, 115 on both surfaces 112, 114 of the glass article 100 may be different from conventional glass articles with anti-glare properties. More specifically, as shown in FIG. 4, a conventional glass article 400 may only have a first surface 412 with surface features 413 thereon. That is, the conventional glass article 400 lacks surface features on a second surface 414 thereof. While there may be a plurality of reasons for why surface features may not be included on both surfaces of the glass article 400, in some instances it may be due to a lack of need for anti-glare properties on both surfaces of the glass article 400, as only one surface is outward facing when the glass article 400 is integrated within an electronic device. That is, the second surface is contacting or facing other components of an electronic device, such as a digitizer, an LED panel, or the like where light is not reflected off the second surface 414 (i.e., nothing to cause glare). In addition, conventional technology is primarily focused on increasing sparkle, which may be difficult to achieve with double sided surface features. Moreover, double sided surface features may be difficult to implement in instances where an air gap may exist between the glass article and the electronic components located thereunder. Providing an anti-glare coating on both surfaces of a glass article as described herein to avoid warp has not been recognized.

Figure 5:
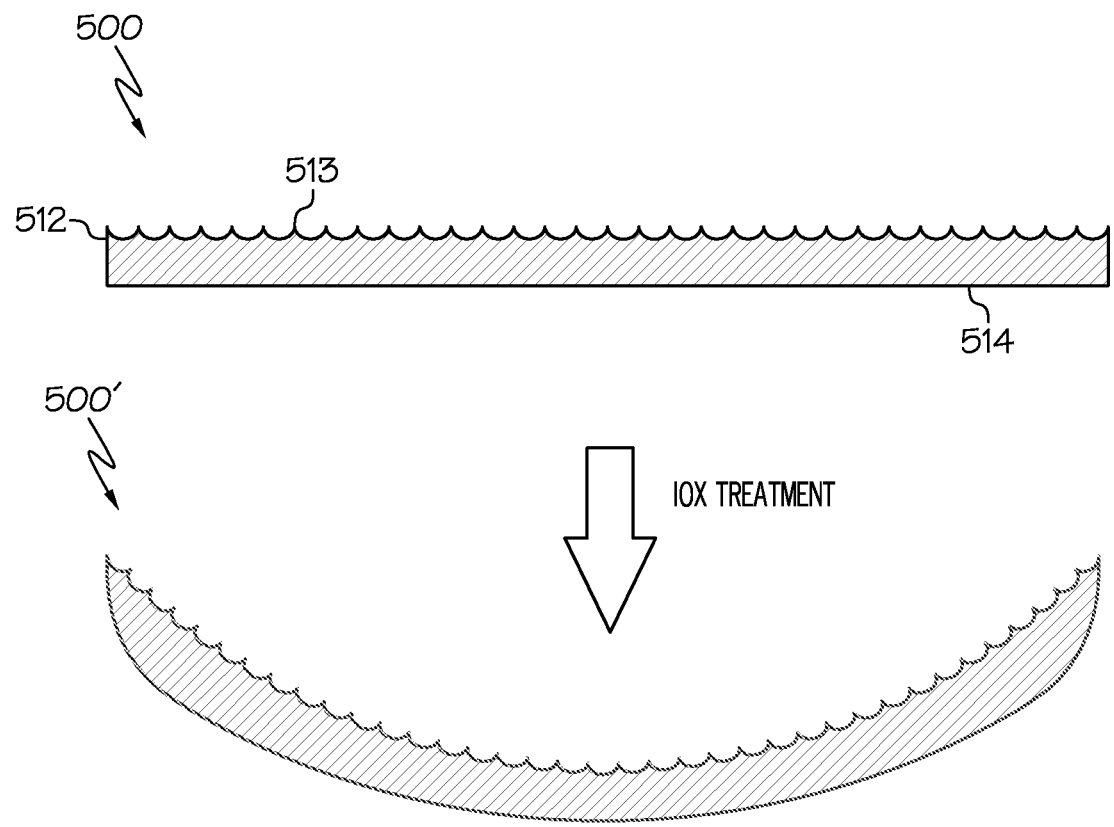
FIG. 5 schematically depicts an illustrative warp evolution that occurs during formation of the glass-based article of FIG. 4.

However, glass articles for larger electronic panels that only include anti-glare properties on one of the two sides as depicted in FIG. 4 are susceptible to warp. Warp may occur before or after an IOX treatment step, which results in a glass article that is not substantially flat. For example, as shown in FIG. 5, a glass article 500 having undergone a process of forming anti-glare features 513 on only a single surface 512 thereof, may exhibit warping, thereby resulting in a warped glass article 500' following an IOX treatment step. The second surface 514 is free from anti-glare treatment and therefore anti-glare features. Without being bound by theory, the non-uniform thickness of the glass article 500 with surface features 513 only on a single surface 512 thereof may create non-uniform stress profiles within the glass article due to the IOX treatment step. The non-uniform stress profiles may create a bending moment, thereby causing the glass article 500 to warp. Thus, large ion-exchanged glass articles having anti-glare treatment on only a single side surface has a high possiblity of exhibiting large warp after IOX treatment.

Figure 6:
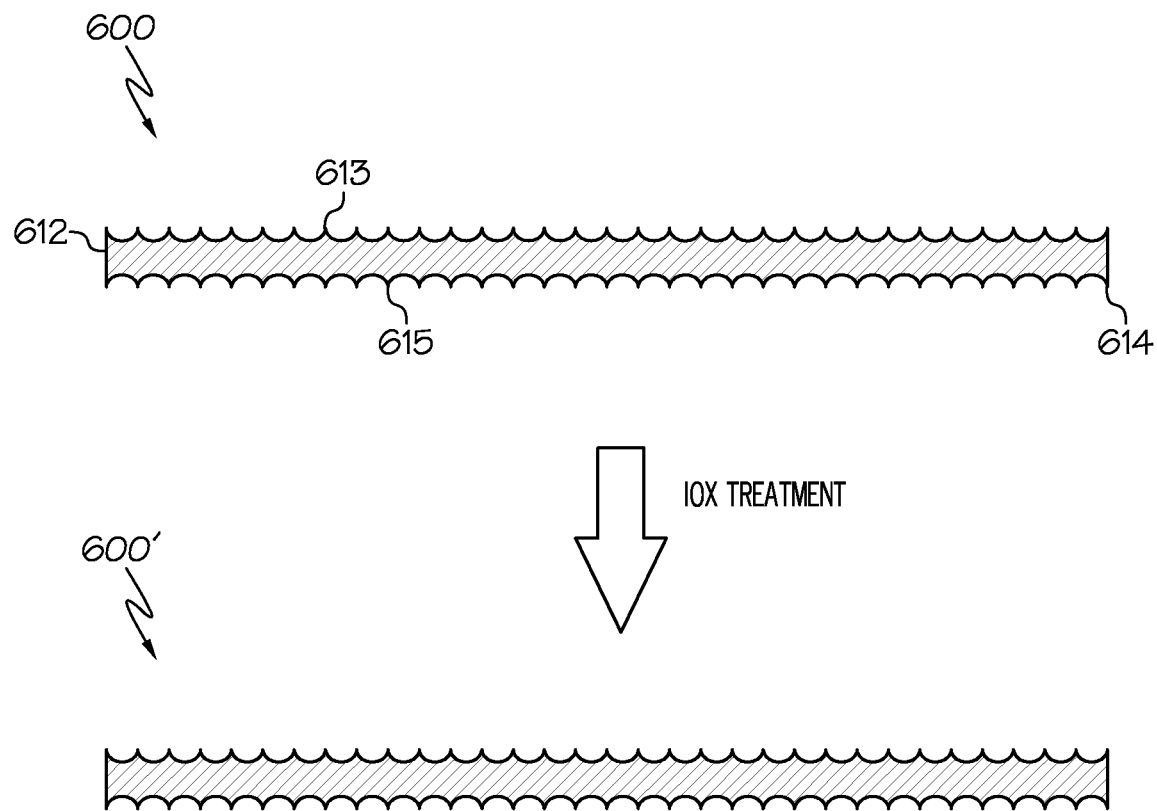
FIG. 6 schematically depicts an illustrative warp evolution that occurs during formation of the glass article of FIG. 2 according to one or more embodiments shown and described herein.

Referring to FIG. 6, a glass article 600 having first surface features 613 on a first surface 612 and second surface features 615 on a second surface 614 is schematically illustrated. The symmetrical surface textures provided by the first surface features 613 and second surface features 615 reduce the warp experienced by the glass article 600' following an IOX treatment step.

Figure 7:
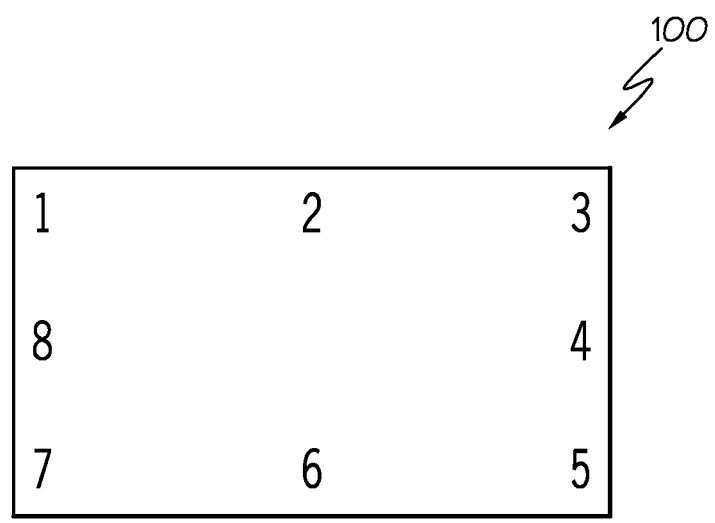
FIG. 7 schematically depicts a plurality of warp measurement locations of a glass-based article according to one or more embodiments shown and described herein.

An amount of warp exhibited by a glass article is determined by use of a feeler gauge. The glass article is disposed on a flat stage. The leaves of the feeler gauge are disposed underneath the glass article to determine the height of the gap between the glass article and the flat stage. Referring to FIG. 7, a plurality of points (e.g., eight points (1-8)) are measured for each side of the glass article 100 (e.g., for a total of sixteen measurements). The maximum measurement from the sixteen points is considered the amount of warp for the particular glass article.

The amount of warp of a glass article may change following individual processing steps. For example, a glass article may exhibit a particular amount of warp following the anti-glare process, a particular amount of warp following a trim process wherein the glass article is cut or otherwise shaped to a particular size, and a particular amount of warp following an IOX process.

As shown below, the double-sided anti-glare treatment reduces the amount of warp of a glass article. In one test, eighteen (18) samples were evaluated for warp using a feeler gauge prior to anti-glare treatment, after anti-glare treatment, after a trimming process, and after IOX. Bare glass, glass with a single-sided anti-glare treatment, and glass with two-sided anti-glare treatment were evaluated for warp.

For the samples provided in Table 1 below, the glass used had the following composition in mol % on an oxide basis: 67.37% $SiO_2$; 3.67% $B_2O_3$; 12.73% $Al_2O_3$; 13.77% $Na_2O$; 0.01% $K_2O$; 2.39% MgO; 0.003% $TiO_2$; 0.01% $Fe_2O_3$; 0.01% $ZrO_2$; 0.09% $SnO_2$. The glass was 2 mm in thickness and was 590 mm×380 mm for an etching cream anti-glare treatment. Following the anti-glare treatment, the glass was trimmed to 536 mm×348 mm and then ion-exchanged.

TABLE 1

| Sample | | Warp | | | | Warp variation rate | | |
|---|---|---|---|---|---|---|---|---|
| | | Cut | AG | Trim | IOX | Cut to AG | AG to Trim | Trim to IOX |
| Bare glass | #1 | 0.3 | 0.3 | 0.3 | 0.3 | 0% | 0% | 0% |
| | #3 | 0.3 | 0.3 | 0.25 | 0.4 | 0% | −17% | 60% |
| | #4 | 0.3 | 0.3 | 0.25 | 0.2 | 0% | −17% | −20% |
| | #5 | 0.25 | 0.25 | 0.2 | 0.25 | 0% | −20% | 25% |
| | #6 | 0.09 | 0.09 | 0.1 | 0.1 | 0% | 11% | 0% |
| | AVE (Bare) | | | | | 0% | −8% | 13% |
| Single AG | #7 | 0.3 | 0.5 | 0.4 | 0.6 | 67% | −20% | 50% |
| | #8 | 0.15 | 0.25 | 0.1 | 0.4 | 67% | −60% | 300% |
| | #10 | 0.3 | 0.5 | 0.3 | 0.6 | 67% | −40% | 100% |
| | #11 | 0.4 | 0.4 | 0.4 | 0.5 | 0% | 0% | 25% |
| | AVE (Single) | | | | | 50% | −30% | 119% |
| Double AG | #13 | 0.2 | 0.2 | 0.2 | 0.2 | 0% | 0% | 0% |
| | #14 | 0.15 | 0.15 | 0.2 | 0.15 | 0% | 33% | −25% |
| | #15 | 0.3 | 0.4 | 0.3 | 0.3 | 33% | −25% | 0% |
| | #16 | 0.3 | 0.3 | 0.25 | 0.2 | 0% | −17% | −20% |
| | #17 | 0.4 | 0.4 | 0.4 | 0.4 | 0% | 0% | 0% |
| | #18 | 0.2 | 0.2 | 0.2 | 0.2 | 0% | 0% | 0% |
| | AVE (Double) | | | | | 6% | −1% | −8% |

The etching cream that used to roughen the surface of glass samples #7-#18 in Table 1 was composed of 10-20 wt % $NH_4F$ and 10-20 wt % $NH_4HF_2$, 0-10 wt % $KNO_3$, 5-20 wt % $BaSO_4$ as filler, 1-10 wt % soluble starch, 0-5 wt % Polyacrylamide, 1-25 wt % $CuCl_2$. To prepare the etching cream, the solid powder chemicals were first weighted and mixed in a plastic container, and then 10-40 wt % of deionized (DI) water was added into the container with manual agitation. After that, 5-20 wt % of concentrated HF acid (40%) solution was added slowly with manual agitation with a plastic stick. When all the HF acid was added, the manual agitation was continued until a fluid slurry was formed. Then this etching slurry was further agitated by mechanical agitator for another 2 hours or kept at ambient conditions for 24 hours before use to reach a chemical equilibrium. The room temperature was kept at 23° C. for all the time.

Other soluble metal ion salts are also contemplated, such as $CaCl_2$, $Ca_2SO_4$, $MgCl_2$, $Mg_2SO_4$, $Mg(NO_3)_2$, $FeCl_3$, $Fe_2(SO_4)_3$, $Fe(NO_3)_3$, $CoCl_2$, $Co_2SO_4$, $Co(NO_3)_2$, $NiCl_2$, $Ni_2SO_4$, $Ni(NO_3)_2$, $ZnCl_2$, $Zn_2SO_4$, and/or $Zn(NO_3)_2$, which may also generate the similar surface morphology for this type of application.

The subsequent trimming process and IOX treatment were performed for all eighteen samples under the same conditions. To indicate the evolution of glass warp in anti-glare glass products, a series of warp measurements were performed in each step of production using a feeler gauge and a flat stage.

Figure 8:
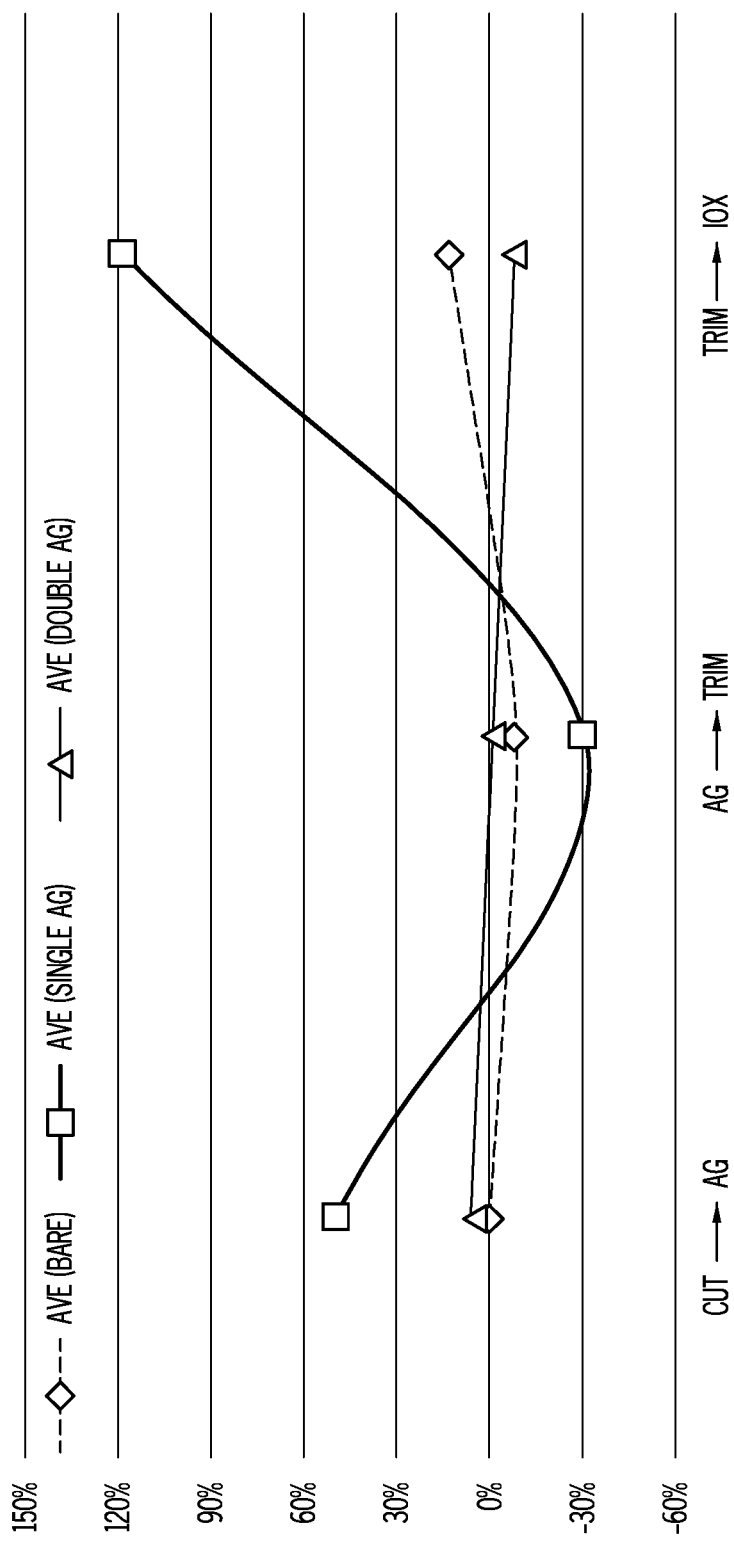
FIG. 8 schematically depicts a warp variation rate for a glass-based article with no anti-glare treatment, a glass-based article with a single anti-glare surface, and a glass-based article with two anti-glare surfaces.

The warp numbers for each sample are provided in Table 1 above. The warp variation rate is obtained by equation of Rate=(Warp1−Warp0)/Warp0*100%. FIG. 8 shows warp variation for bare glass with no anti-glare treatment, glass with a single anti-glare treatment, and glass with double-sided anti-glare treatment. Two-side anti-glare treated glass has similar warp changing behavior with bare glass during anti-glare, trim and IOX treatment; their variation rates are very low. Single-side anti-glare treated glass has much more warp variation rate than double-side etching glass and bare glass.

FIG. 8 indicates that the single-side etching glasses show large warp increasing (50%) due to anti-glare treatment and even higher warp increased (119%) by the IOX treatment. Comparatively, the double-side etching glasses exhibit similar warp change behavior as low as bare glass, which is <13%. The resulting anti-glare attributes of haze, gloss 60, DOI and sparkle for the samples #7-#18 are listed in Table 2 below.

TABLE 2

| | Sample ID | Haze(T) | Gloss60 | DOI | Sparkle |
|---|---|---|---|---|---|
| Single AG | 7 | 9.6 | 89.3 | 98.9 | 0.97 |
| | 8 | 9.6 | 90.8 | 98.9 | 0.98 |
| | 9 | na | na | na | na |
| | 10 | 10.2 | 86.8 | 98.8 | 1.01 |
| | 11 | 10.9 | 80.3 | 98.6 | 1.07 |
| Double AG | 13 | 18.5 | 58.2 | 94.2 | 1.12 |
| | 14 | 18.0 | 60.5 | 95.7 | 1.10 |
| | 15 | 18.9 | 55.2 | 91.6 | 1.11 |
| | 16 | 18.9 | 56.6 | 92.5 | 1.06 |
| | 17 | 20.2 | 51.9 | 89.8 | 1.24 |
| | 18 | 20.0 | 53.0 | 90.7 | 1.22 |

As shown in Table 2 above, optical performance of the glass article is not significantly affected by the anti-glare treatment on both surfaces of the glass article. Thus, dual-surface anti-glare treatment is a viable method for reducing warp in glass articles, particularly large glass articles having a dimension of 500 mm or greater.

It is noted that the optical performance of a glass article with dual-surface anti-glass treatment will be different depending on if there is an air gap between the glass article and one or more additional components of a display panel, or if one surface of the glass article is direct bonded to the one or more additional components of the display by an index-matching adhesive. As shown in Table 3 below, optical performance with respect to haze and gloss may be improved when the glass article is bonded to one or more components of the display panel by an index-matching adhesive over the case where there is an air gap present.

TABLE 3

|  | Measurement Side | Thickness (mm) | Optical results (Mean) | | | | |
| --- | --- | --- | --- | --- | --- | --- | --- |
|  |  |  | Transmittance | Haze-T | Gloss 60 (GU) | DOI | Sparkle |
| Single-side AG | Side A | 1.956 | 93.70 | 4.89 | 106.51 | 98.23 | 1.01 |
|  | Side B | 1.956 | 93.70 | 4.89 | 102.93 | 99.48 | 1.03 |
| Double-side AG with Air Gap | Side A | 1.925 | 93.80 | 9.47 | 72.19 | 95.64 | 1.10 |
|  | Side B | 1.925 | 93.80 | 9.42 | 72.29 | 95.48 | 1.10 |
| Double-side AG with Direct Bond | Side A | 2.624 | 92.60 | 5.79 | 113.51 | 98.24 | 0.94 |
|  | Side B | 2.624 | 92.60 | 5.88 | 114.77 | 99.43 | 1.05 |

Thus, in cases where there is an air gap present, the anti-glare treatment for both surfaces of the glass article may be manipulated such that a total desired haze and/or gloss value for the glass article is achieved. For example, the anti-glare surfaces may be such that each surface contributes to 50% of the haze and/or gloss value. Any other ratios are also possible. As an example and not a limitation, parameters of the anti-glare treatment may be manipulated such that the environment facing surface may contribute 40% of the haze and/or gloss value and the device facing surface may contribute 60% of the haze and/or gloss value and vice versa.

It should now be understood that embodiments of the present disclosure reduce the amount of warp in anti-glare glass articles before and/or after an ion-exchange process by treating both surfaces of the glass articles with an anti-glare treatment.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A strengthened glass-based article comprising:
    a first anti-glare surface having a plurality of first anti-glare features comprising one or more protrusions, one or more depressions, or a combination thereof;
    a second anti-glare surface having a plurality of second anti-glare features comprising one or more protrusions, one or more depressions, or a combination thereof, wherein:
        at least one dimensional aspect of the glass-based article is greater than or equal to 500 mm, the at least one dimensional aspect is a length, a width, or a diagonal of the glass-based article, and
        the glass-based article has a warp of less than or equal to 0.6 mm across the at least one dimensional aspect.

2. The strengthened glass-based article of claim 1, wherein the first surface and the second surface equally contribute to a total haze value of the glass-based article.

3. The strengthened glass-based article of claim 1, wherein the first surface and the second surface equally contribute to a total gloss value of the glass-based article.

4. The strengthened glass-based article of claim 1, wherein the first surface and the second surface unequally contribute to a total haze value of the glass-based article.

5. The strengthened glass-based article of claim 1, wherein the first surface and the second surface unequally contribute to a total gloss value of the glass-based article.

6. The strengthened glass-based article of claim 1, wherein a total transmission haze of the glass-based article is between 1% and 40%.

* * * * *